United States Patent Office 2,713,475
Patented July 19, 1955

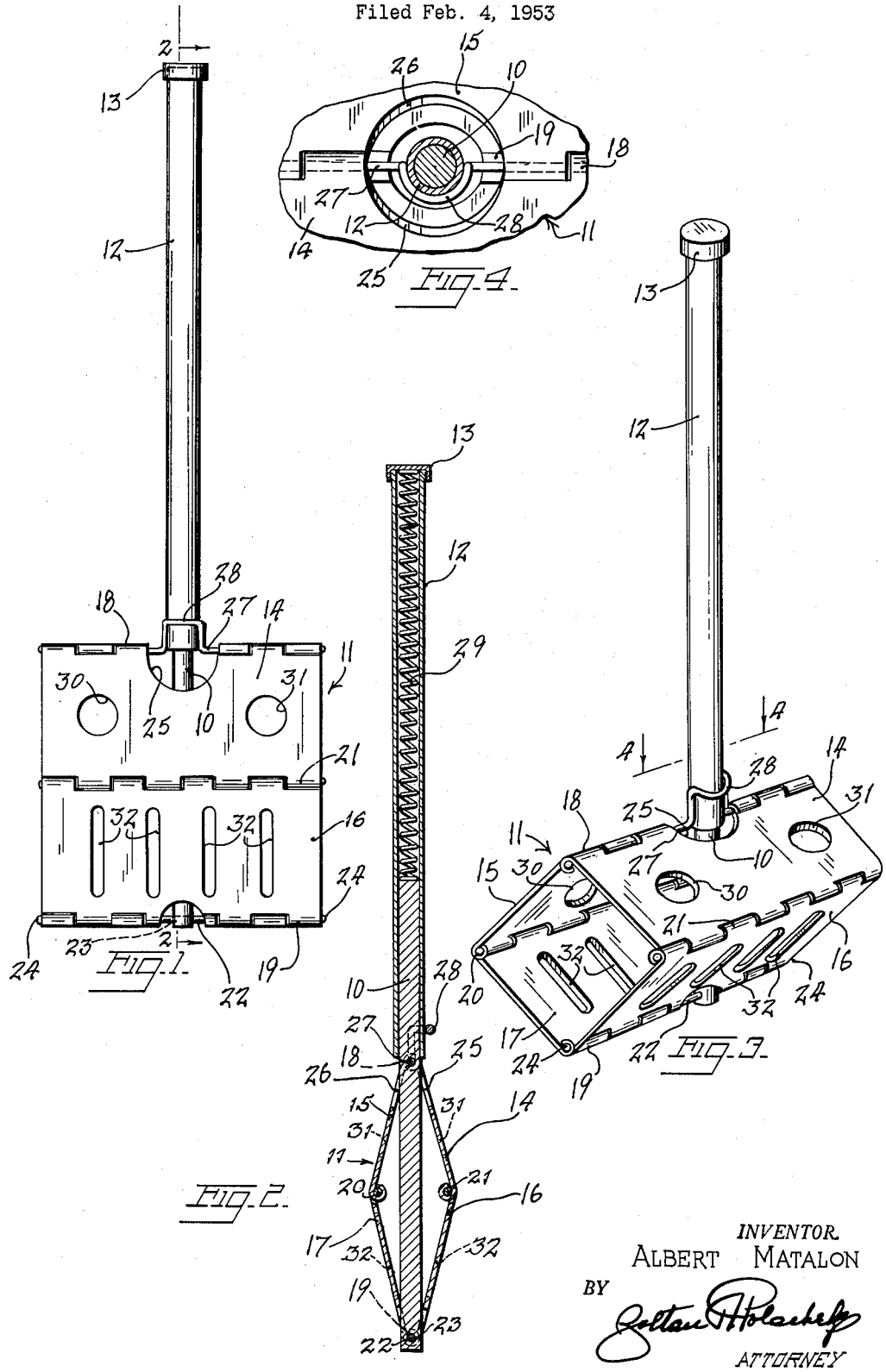

2,713,475

PORTABLE EGG BEATER

Albert Matalon, New York, N. Y.

Application February 4, 1953, Serial No. 335,107

1 Claim. (Cl. 259—128)

This invention relates to new and useful improvements in portable egg beaters.

A principal object of the present invention is to provide an egg beater which can be easily manipulated with a minimum of manual labor to thoroughly beat eggs, or other fluid or semi-fluid materials.

Another object of the invention is to provide an egg beater which is adapted to beat the egg material by either a rotary movement or a reciprocating movement.

A further object of the invention is to provide an egg beater which is strong and durable in construction and highly efficient in use.

It is further proposed to provide an egg beater which is of simple construction and which may be manufactured and sold at a reasonable cost.

The invention broadly consists of an egg beater having a tubular handle, a spindle longitudinally movable within said handle, a dasher body supported on said movable spindle and adapted to be rotated or reciprocated by the handle, and a spring within the handle resisting the movement of said spindle in one direction.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a front elevational view of an egg beater embodying my invention.

Fig. 2 is a vertical sectional view taken on the plane of the line 2—2 of Fig. 1.

Fig. 3 is a perspective view of the egg beater in collapsed or contracted condition.

Fig. 4 is a fragmentary enlarged horizontal sectional view taken on the plane of the line 4—4 of Fig. 3.

In the preferred embodiment of my invention shown in the drawings, a spindle 10 supports a dasher body 11 so that the body can slide therealong and at the same time contract or expand. An elongated tubular handle 12 is telescopically and slidably mounted on the upper end of the spindle 10 for actuating the dasher body, and is closed at its opposed end by a screw-threaded cap 13.

The dasher body 11 consists of two pairs of hinged metal beating blades or plates designated as 14, 15, 16, 17, which blades are hinged together in upper and lower pairs as indicated at 18 and 19, respectively, and the pairs are hinged together as indicated at 20 and 21. The hinge joint 19 is stationary, the rod 22 of the hinge being passed through an opening 23 in the spindle 10 and held against displacement by screw plugs 24 at its ends. The hinges 20 and 21 are folding hinges so that the upper and lower pairs of blades may be folded outwardly at the center of the dasher body as shown in Fig. 3 as the egg beater is operated. The hinge joint 18 at the upper end of the dasher body between the two blades 14 and 15 is a slidable joint and for this purpose the upper central edges of the blades 14 and 15 are recessed as indicated at 25 and 26, respectively, and the portion of the hinge rod 27 of the joint at this point is bent upon itself, extending upwardly along the spindle and handle and shaped in the form of a semicircular loop 28. The loop 28 is clamped around the bottom end of the handle 12 whereby the handle is operatively connected to the dasher body 11, for rotating the dasher body or reciprocating the body vertically along the spindle. An expelling and restoring spring 29 is housed in the handle 12, its bottom end seated against the inner end of the spindle 10, and its upper end against the cap 13 for normally holding the spindle 10 outwardly of the handle in distended position. The removable cap 13 affords ready assembly and inspection or replacement of the spring.

The blades 14 and 15 of the upper pair of blades of the dasher body 11 are provided with circular openings 30 and 31 and the blades 16 and 17 of the lower pair of blades with elongated openings 32 through which the egg material is passed as the folding dasher body opens and closes.

In operation, the dasher body 11 of the egg beater is immersed in the egg material or other material contained in a suitable receptacle with the bottom end of the spindle 10 resting on the bottom of the receptacle. The handle 12 may either be manually rotated spinning the dasher body 11 in the egg material while the dasher body is in distended condition, or the handle may be reciprocated against the action of spring 29 with the result that the blades of the dasher body are caused to fold or unfold on their hinges with a contracting or distending movement, respectively. The egg material is thus forced through the openings 30, 31 and 32 and through the space between the blades. When the pressure on the handle is released, the spring 29 restores the handle to normal inoperative position. Thus, the thorough agitation of the egg material or other material with relatively little manual exertion is obtained.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:

An egg beater comprising a spindle, a dasher body slidably supported on said spindle, said body having pairs of blades hingedly connected at their ends and normally collapsed against the spindle, the individual blades of each pair being hinged together, said blades having openings therein, a tubular handle slidably mounted on and enclosing one end of said spindle, a cap removably secured to the other end of said handle, one pair of blades being connected to the spindle by the hinge rod of said pair, means of operative connection between the other pair of blades and the handle including a loop portion on the hinge rod of said latter pair of blades, said loop portion partly encircling the handle and being clamped to one end thereof, and a compression spring housed in the handle and having one end seated against the cap and its other end against the inner end of said spindle for retracting the handle when pressure thereupon is released to return said blades to collapsed condition.

References Cited in the file of this patent

UNITED STATES PATENTS

| | | |
|---|---|---|
| 1,220,923 | Wolfe | Mar. 27, 1917 |
| 2,045,171 | Wiegandt | June 23, 1936 |